US012687057B1

(12) United States Patent
Snearl

(10) Patent No.: US 12,687,057 B1
(45) Date of Patent: Jul. 21, 2026

(54) ADJUSTABLE LOCK FOR INWARD OPENING DOORS

(71) Applicant: Lisa Snearl, Port Allen, LA (US)

(72) Inventor: Lisa Snearl, Port Allen, LA (US)

( * ) Notice: Subject to any disclaimer, the term of this patent is extended or adjusted under 35 U.S.C. 154(b) by 0 days.

(21) Appl. No.: 19/014,601

(22) Filed: Jan. 9, 2025

(51) Int. Cl.
*E05C 19/00* (2006.01)
*E05C 17/04* (2006.01)
*E05C 17/54* (2006.01)

(52) U.S. Cl.
CPC .......... *E05C 19/004* (2013.01); *E05C 19/003* (2013.01); *E05C 17/047* (2013.01); *E05C 17/54* (2013.01)

(58) Field of Classification Search
CPC .... E05C 19/004; E05C 19/003; E05C 19/007; E05C 17/047; E05C 17/30; E05C 17/54; E05C 19/005; E05C 19/18; E05C 9/02; E05C 9/06
See application file for complete search history.

(56) References Cited

U.S. PATENT DOCUMENTS 197,187 A * 11/1877 Voege .................... E05C 17/54 254/39
1,054,151 A * 2/1913 Troetel .................. E05C 17/443 292/338
1,064,320 A * 6/1913 Glindkamp ........... E05C 19/004 292/339
1,304,394 A * 5/1919 Shyer .................... E05C 17/443 292/338
1,693,481 A * 11/1928 Harper .................. E05C 19/005 292/259 R
3,731,341 A * 5/1973 Woodruff .............. E05C 19/004 292/297
3,868,630 A * 2/1975 Lesondak ............... E01F 13/02 116/63 P
3,976,213 A * 8/1976 Ball ...................... B60P 3/1025 414/549
4,078,836 A * 3/1978 Wilson .................. E05C 19/003 292/259 R
4,082,337 A * 4/1978 Greco ................... E05C 19/004 292/238
4,198,088 A * 4/1980 Tochihara ............... E05C 19/18 292/288
4,372,536 A * 2/1983 Morse ..................... E01F 13/02 256/64

(Continued)

*Primary Examiner* — Christine M Mills
*Assistant Examiner* — Faria F Ahmad
(74) *Attorney, Agent, or Firm* — ROY KIESEL FORD DOODY & NORTH, APLC

(57) ABSTRACT

An adjustable door lock. The lock includes a vertically adjustable frame with an upper cross-bar opposite a base. The upper cross-bar is preferably padded. The base is provided with a horizontal lip. At least two risers extend between the upper cross bar and the base. The risers allow the height of the frame to be increased or decreased. A brace is hinged to the frame. The brace includes a slip resistant foot. In operation, the lip is inserted beneath the door, and the frame is expanded until the upper cross-bar firmly abuts the door knob. The brace is then extended away from the door to position the foot against the floor. The risers are locked in place to secure the height of the frame and the brace is locked in place. Once in place, the frame and the brace will prevent the door from being opened inwardly.

17 Claims, 13 Drawing Sheets

(56) References Cited

U.S. PATENT DOCUMENTS 4,421,348 A * 12/1983 Kahn .................... E05C 19/004 292/339
4,634,158 A * 1/1987 Jones .................... E05C 19/005 292/260
4,666,195 A * 5/1987 Thomas, III .......... E05C 19/004 292/336.3
4,673,203 A * 6/1987 Chezem ................ E05C 17/443 292/338
4,676,536 A * 6/1987 Arbic .................... E05C 19/004 248/354.1
4,747,181 A * 5/1988 Davis .................... E05C 19/003 16/82
4,759,577 A * 7/1988 Thomas, III .......... E05C 19/004 292/338
5,169,042 A * 12/1992 Ching ....................... B60R 9/06 224/535
5,207,464 A * 5/1993 Reeves, Jr. ........... E05C 19/004 292/343
5,228,607 A * 7/1993 Tolsdorf .................... B60R 9/06 224/520
5,294,159 A * 3/1994 Corrigan ............. E05B 65/0888 292/263
5,339,567 A * 8/1994 Pierpont ................... E06B 9/01 D25/48.8
5,392,570 A * 2/1995 Cowan ...................... E06B 9/01 52/106
5,503,443 A * 4/1996 Tautfest ................ E05C 19/004 292/339
5,544,386 A * 8/1996 Cobb .................... E05C 19/004 292/288
5,560,666 A * 10/1996 Vieira ....................... B60P 3/40 410/116
5,649,656 A * 7/1997 Davy .................... B60P 3/1025 224/532
5,673,952 A * 10/1997 Chezem ................ E05C 17/443 292/338
5,711,110 A * 1/1998 Williams .............. E01F 13/085 49/31
5,740,628 A * 4/1998 Almond .................... E06C 9/10 49/141
5,893,235 A * 4/1999 Almond ................ E05C 19/003 49/63
5,924,751 A * 7/1999 Moore .................. E05C 17/047 292/288
6,099,220 A * 8/2000 Poth .......................... B60P 7/08 410/121
6,120,072 A * 9/2000 Benedict ............... E05C 17/443 292/338
6,261,038 B1 * 7/2001 Cowan ................. B61D 45/006 410/121
6,308,996 B1 * 10/2001 Ganimian ............. E05C 19/003 292/259 R
6,349,573 B1 * 2/2002 Johnson .................. B60R 25/00 70/101
6,378,917 B1 * 4/2002 Jones .................... E05C 19/184 292/53
6,393,879 B1 * 5/2002 William ................ E05B 73/007 70/164
6,454,323 B1 * 9/2002 Mills ..................... E05C 19/004 292/338
6,517,134 B2 * 2/2003 Armstrong ................ B60R 9/06 296/26.05
6,675,615 B1 * 1/2004 Williams .............. E05B 73/007 70/164
6,705,796 B2 * 3/2004 Lund ....................... E01F 9/688 116/63 P
7,137,655 B2 * 11/2006 Quarberg .............. E05C 19/004 248/351
7,195,294 B1 * 3/2007 White ................... E05C 19/003 292/259 R
8,464,460 B1 * 6/2013 Runyan ...................... F41J 1/00 296/182.1
8,794,866 B2 * 8/2014 Petryshyn ............. E01F 13/085 404/6
9,487,152 B2 * 11/2016 Scott ....................... B60R 9/045
10,689,885 B2 * 6/2020 Loudenslager ......... E05C 21/00
11,053,718 B2 * 7/2021 Finley ................... E05C 19/003
11,189,138 B2 * 11/2021 Anderson ............... E01F 13/12
11,530,558 B2 * 12/2022 Grant .................... E05C 19/003
11,898,386 B1 * 2/2024 Mitchell ............... E05C 17/045
12,059,993 B1 * 8/2024 McElligott .......... E05B 65/0003
12,151,651 B2 * 11/2024 Rolson .................... B60R 3/007
12,165,477 B2 * 12/2024 Anderson ............... E01F 13/12
12,173,459 B2 * 12/2024 Jones ...................... E01F 13/02
12,392,178 B2 * 8/2025 Kelch ....................... E05C 3/06
12,392,179 B2 * 8/2025 Yang ..................... E05C 19/004
12,460,458 B2 * 11/2025 Finley ................... E05C 19/005
12,479,370 B2 * 11/2025 VanAmburgh ............ B60R 9/06
2004/0070217 A1 * 4/2004 Demlow ............... E05C 17/443 292/339
2007/0164573 A1 * 7/2007 Reimer ................ B65D 90/008 292/259 R
2024/0360710 A1 * 10/2024 Weir ..................... E05C 19/005

* cited by examiner

Fig 10
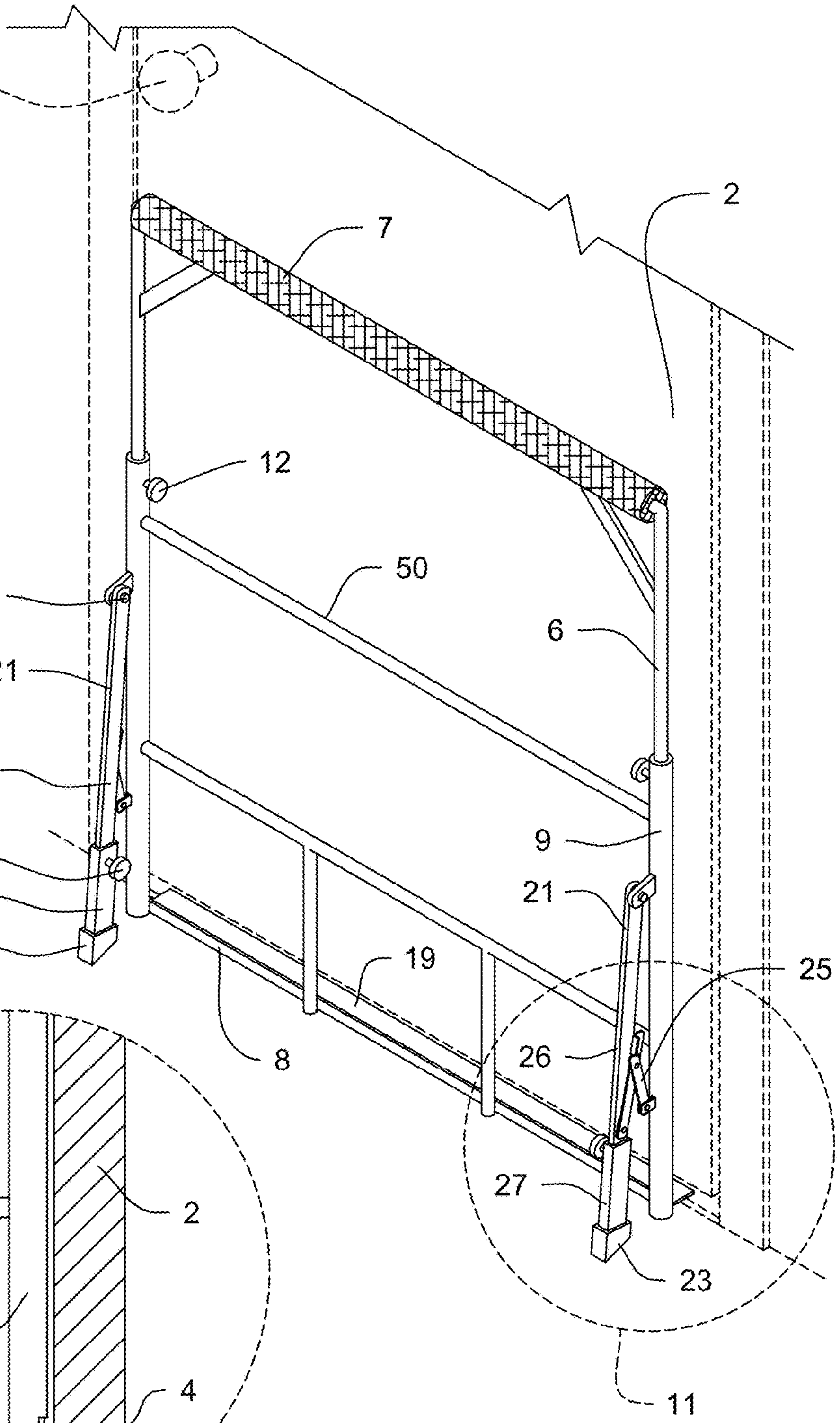
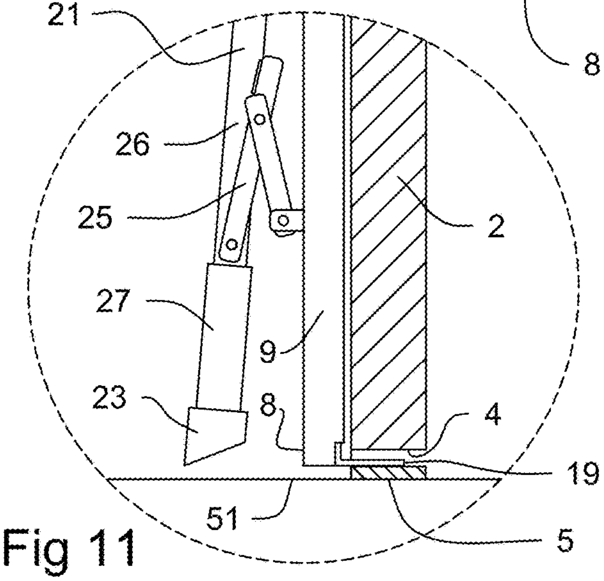
Fig 11

ADJUSTABLE LOCK FOR INWARD OPENING DOORS

PRIOR ART

A basic function of a door is to control ingress and egress into a space. It will often be desirable to be able to lock a door to prevent unauthorized persons from opening the door or entering the space. There are many conventional means for locking a door to the frame in which a door is mounted. A door knob or handle (handles and knobs will be collectively referred to as "knobs" herein) may control a latch bolt. When the door shuts, the latch bolt will engage the strike plate, which will be mounted in the door frame. Latch bolts allow a door to be shut without operating the knob. However, the door cannot be opened unless the knob is turned. By locking the knob to prevent it from turning, the door may be locked.

Another common door lock is a deadbolt. In this type of lock, a bolt is extended into the strike plate mounted in the door frame. A deadbolt, unlike a latch bolt, must be extended into the strike plate by operating the cylinder of the lock. In some deadbolts, a non-keyed control is provided on one side of the door. By turning the control, the cylinder may be operated and the deadbolt extended or retracted. However, on the side of the door exterior to the space being controlled by the door, the cylinder will usually be operable only with a key. Other common types of locks include sliding bolts and chain latches.

All of the lock types discussed above have one thing in common: they all secure the door to the door frame. That makes them susceptible to defeat if the door frame fails. A strong blow to the door, such as a kick, may be sufficient to cause the frame to fail and allow the door to open. Accordingly, a door locking meeting the following objectives is desired.

OBJECTS OF THE INVENTION

It is an object of the invention to provide a lock for a door.

It is another object of the invention to provide a lock for a door that is not dependant on the door frame to secure the door against opening.

It is still another object of the invention to provide a lock for doors of different widths.

It is yet another object of the invention to provide a lock for doors with knobs located at different heights.

It is still another object of the invention to provide a lock for a door that opens inward.

It is yet another object of the invention to provide a lock for a door that will secure the door from the inside of the door.

BACKGROUND OF THE INVENTION

The invention relates to door locks in general and to free standing door locks in particular.

SUMMARY OF THE INVENTION

An adjustable door lock is disclosed. The lock is configured for use with an inward opening door having a knob and a bottom. The door will be mounted in a door frame that may or may not have a sill. The door may or may not be provided with a typical locking mechanism that engages the door frame, such as a dead bolt or latch bolt.

The lock comprises a frame having a base opposite an upper cross-bar and at least two vertical risers extending between the base and the upper cross-bar. The upper cross-bar is preferably padded. The base is provided with a substantially horizontal lip sized and configured to fit beneath the door bottom.

The frame is adjustable. Each of the two vertical risers includes an upper portion and a lower portion slidably disposed relative to each other. This allows the length of the vertical risers to be adjusted. The risers are sized and configured to allow the substantially horizontally disposed lip to be positioned beneath the bottom of the door while allowing the upper cross-bar to fit beneath the door knob. The adjustable risers will allow the cross-bar to be raised to abut the door knob.

A riser lock is positioned on at least one, and preferably all, of the vertical risers. This will allow the position of the upper portion of the riser to be fixed relative to the lower of portion of the riser, thereby fixing the length of the riser and the height of the frame.

The lock also includes a brace having a foot. The brace is adjustably mounted to the frame on a hinge. The hinge will allow the angle between the brace and the frame to range between about zero and about forty-five degrees. (When used herein the terms "about" and "substantially" mean+/−10 percent unless otherwise indicated.). This allows the brace to be adjusted to position the foot on the floor near the door bottom.

A brace lock is also provided. The brace lock will secure the brace at a desired angle relative to the frame.

The frame may also be horizontally adjustable. When the frame is adjustable, the upper cross-bar will have a left hand portion and a right hand portion slidably disposed relative to each other. The frame will preferably be provided with one or more horizontal cross-braces. When the frame is horizontally adjustable, the cross-brace(s) will be provided with a left hand portion and a right hand portion that are slidably disposed relative to each other. By sliding the left hand and right hand portions of the cross-bar and the cross-brace(s) relative to each other, the width of the frame may be adjusted. When the frame is horizontally adjustable, the cross-bar is preferably provided with a cross-bar lock and the cross-brace(s) are preferably provided with a cross-brace lock. The cross-bar lock, the cross-brace lock(s), or all of them will secure the frame at a desired width.

When the frame is horizontally adjustable, the base will preferably be provided in segments with each segment depending from either the left or right hand portion of a cross-brace. The base segments will not be directly connected in this embodiment. This configuration will allow the base segments to expand or contract horizontally with the frame. At least some, and preferably all, of the base segments will include a lip.

In operation, the lip will be positioned beneath the door and the risers will be extended until the upper cross-bar is in firm contact with the bottom of the door knob. The padding will prevent the cross-bar from damaging the door knob while simultaneously helping prevent the frame from sliding relative to the door knob. The pressure of the frame against the door knob and the floor will hold the frame in place in front of the door. The door will prevent the frame from moving outward. By extending the brace away from the frame until the foot is adjacent to the floor, the brace will prevent the frame from moving inward. Once the brace is locked in place, the lock's installation will be complete, and the lock will prevent the door from being opened inwardly.

BRIEF DESCRIPTION OF DRAWINGS

FIG. 10 is a rear perspective view of an embodiment of the adjustable lock positioned in front of the door of FIG. 9 with the cross-bar positioned below the door knob, the lip positioned beneath the door, and the brace in the closed position.

FIG. 11 is a side view of an embodiment of the adjustable lock positioned in front of the door of FIG. 9 with the lip positioned beneath the door, and the brace in the closed position.

DETAILED DESCRIPTION OF THE INVENTION

Figure 1A:
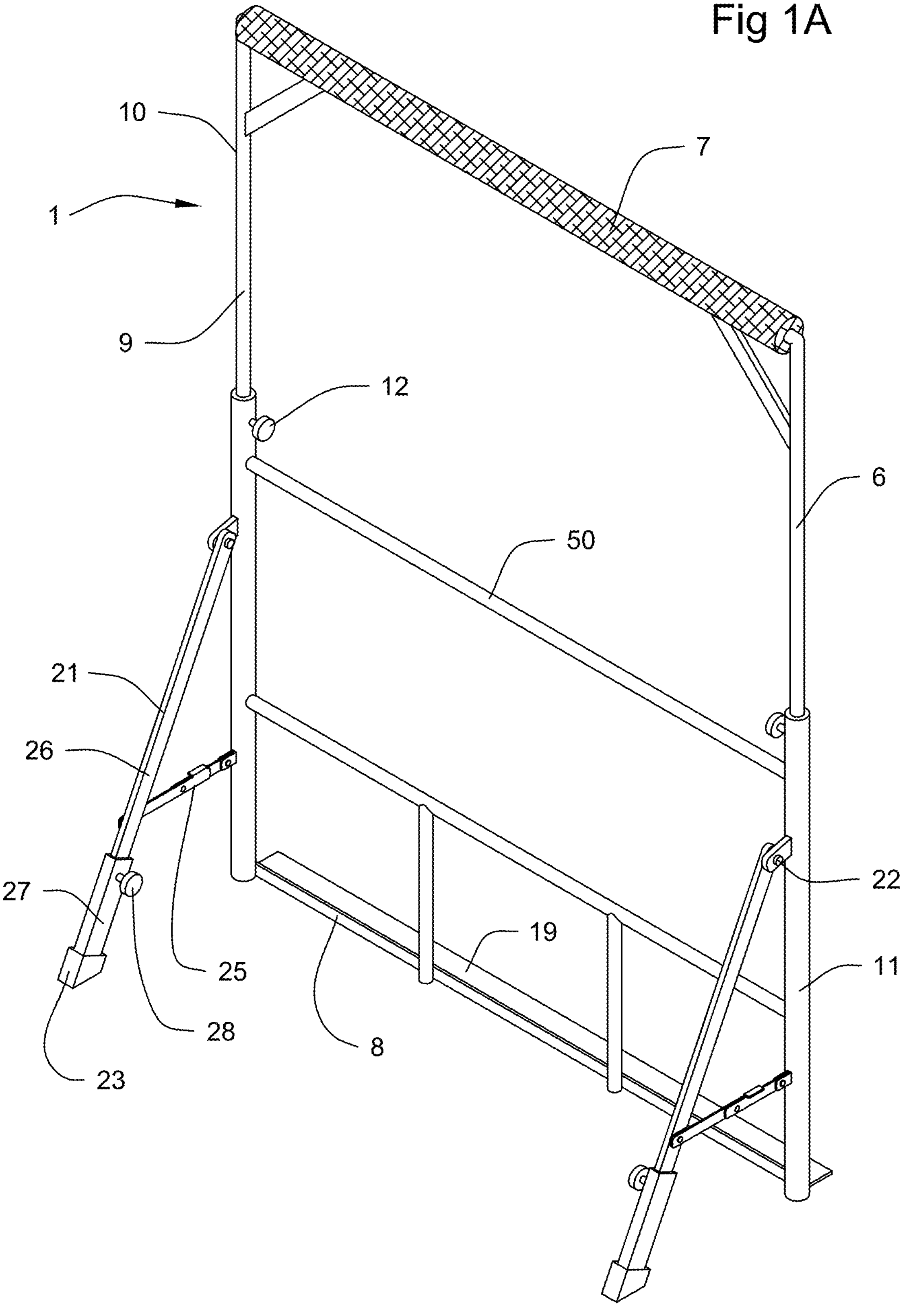
FIG. 1A is a rear perspective view of a preferred embodiment of the adjustable door lock with the brace shown in the open position.
Figure 1B:
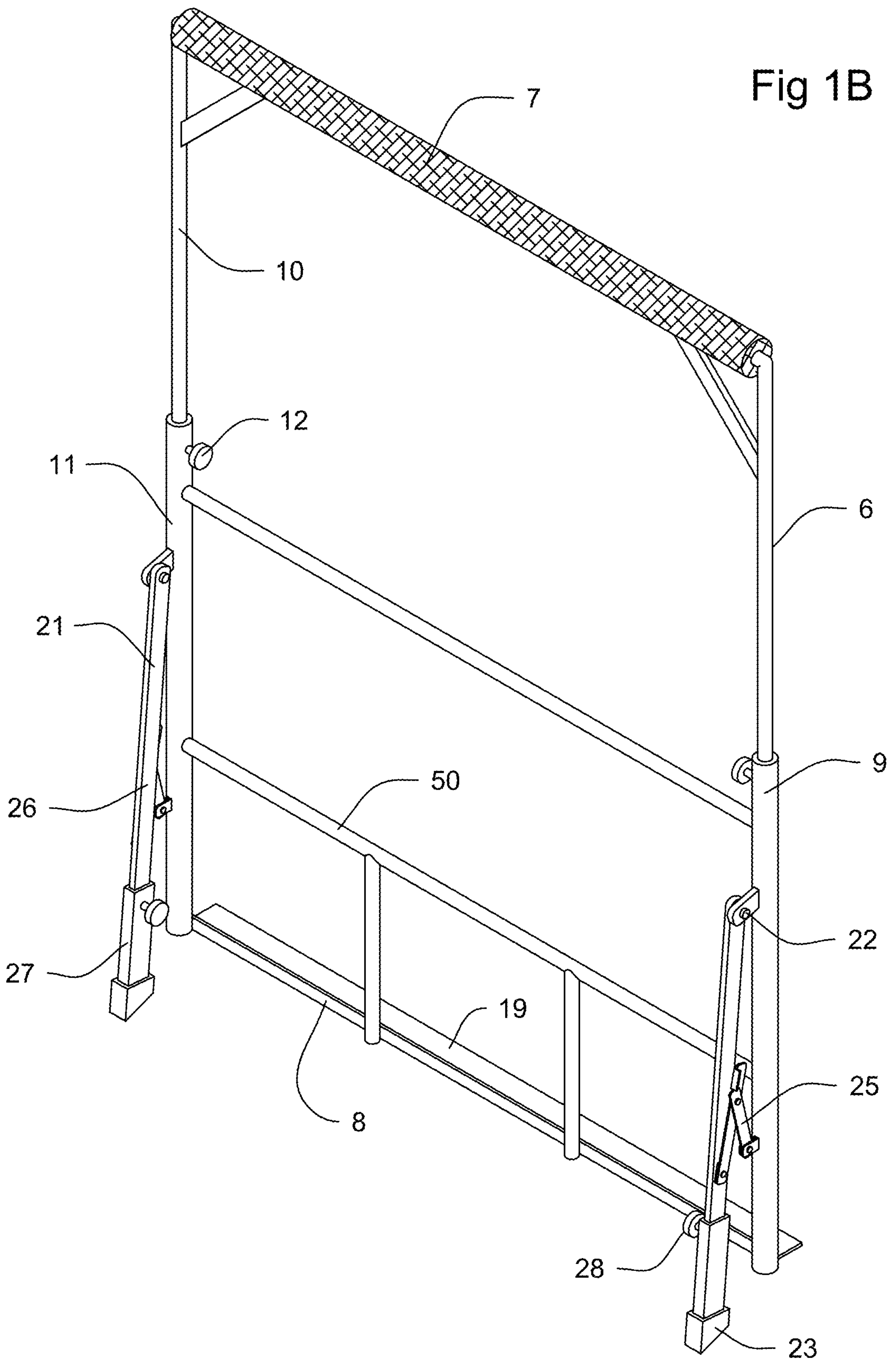
FIG. 1B is a rear perspective view of a preferred embodiment of the adjustable door lock with the brace shown in the closed position.
Figure 2:
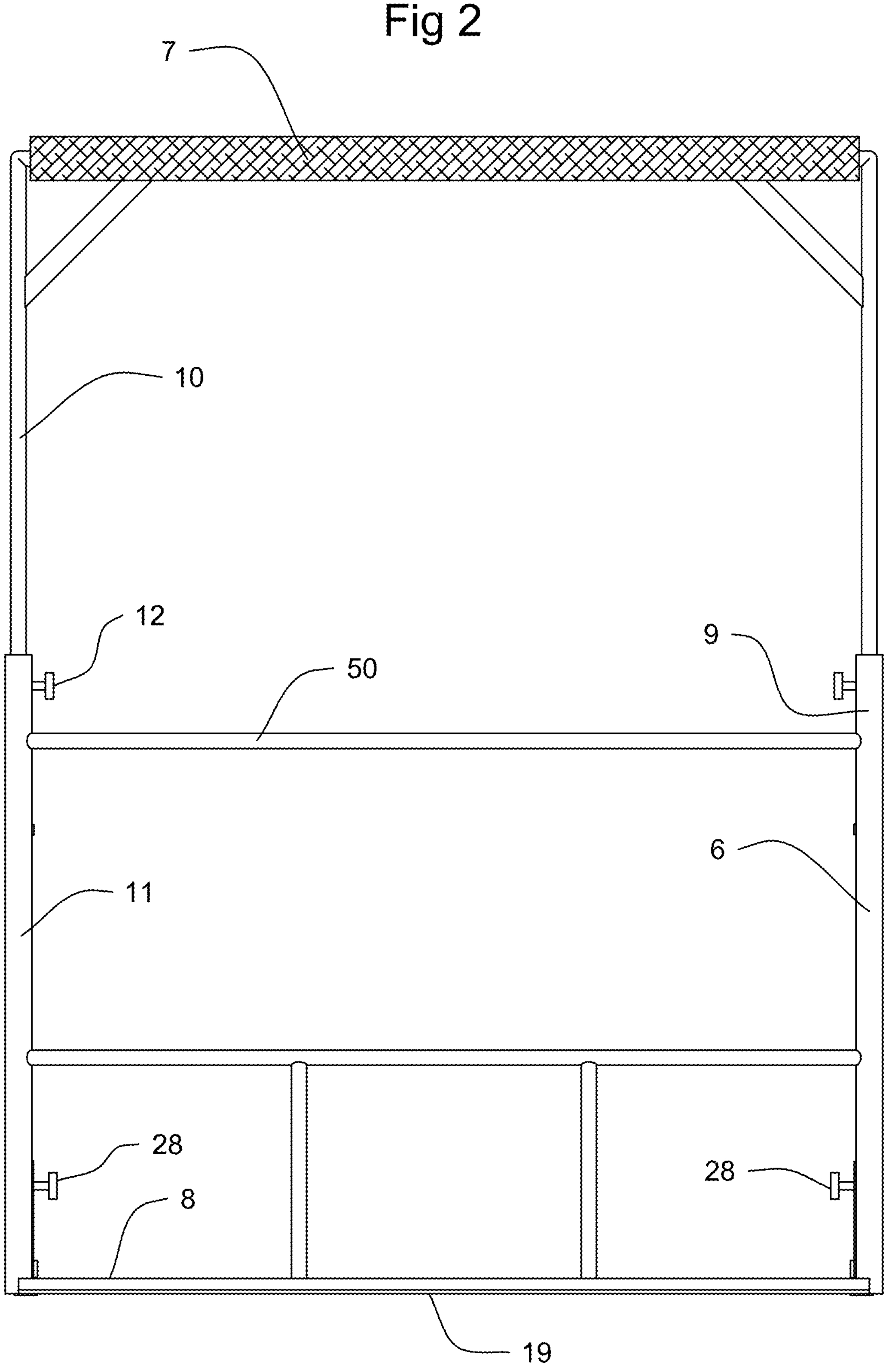
FIG. 2 is a front view of a preferred embodiment of the adjustable door lock.

At A free-standing, adjustable door lock 1 is disclosed. Lock 1 is intended for use with an inward opening door 2 mounted in a door frame 3. Inward, in the context of this invention, means toward the interior of the room or space to which the door allows ingress. Door 2 will have a bottom 4 and will be mounted in door frame 3 so that some space is provided between bottom 4 of door 2 and any sill 5 that may be present in door frame 3.

Lock 1 includes an adjustable frame 6 comprising an upper cross-bar 7 and a base 8 with at least two vertical risers 9 extending between upper cross-bar 7 and base 8. Frame 6 may be provided with horizontal cross-braces 50 between risers 9. Frame 6 and its components are preferably made of a strong material such as steel, titanium, aluminum, or other rigid metals and alloys resistant to deformation. Plastics of suitable strength and stiffness, such as polycarbonates, could be used as well.

Vertical risers 9 are preferably each comprised of an upper portion 10 and a lower portion 11 that are slidably disposed relative to each other. Tubing (square, round, or other cross sections) may be used to form risers 9, but any strong material configured to allow reciprocal sliding of upper portion 10 and lower portion 11 would work. For example, telescoping sliding rails would work for risers 9.

By sliding the riser portions 10, 11 so that cross-bar 7 and base 8 move further apart, the height of frame 6 may be increased. Similarly, by sliding riser components 10, 11 so that cross-bar 7 and base 8 move closer together, the height of frame 6 may be reduced.

A riser lock 12 is preferably provided on at least one, and preferably all, of risers 9. Riser lock 12 should allow risers 9 to be fixed in a desired position. There are a variety of devices that would be suitable for riser locks 12. Locking spring buttons are commonly used to secure sliding tubing at desired levels of extension. Other lock types suitable for use with sliding tubing include clutch locks, split collar locks, cam locks, snap locks, and set knob or set screw locks. These locking mechanisms can be combined. For example, a clamp and a set knob or screw may be used together to provide redundancy.

In some embodiments, frame 6 may be horizontally adjustable as well. In this embodiment, cross-bar 7 is preferably provided with a left hand portion 13 and a right hand portion 15. Similarly, cross-braces 50 are preferably provided with a left hand portion 14 and a right hand portion 16. Left hand portions 13, 14 and right hand portions 15, 16 are slidably disposed relative to each other. The same materials used for risers 9 and upper portion 10 and lower portion 11 may be used for cross-bar 7, cross-brace(s) 50, and their respective left hand portions 13, 14 and right hand portions 15, 16. It will be appreciated that the width of frame 6 may be increased or decreased by sliding left hand and right hand portions 13, 14, 15, 16 relative to each other.

When frame 6 is horizontally adjustable, horizontal locks 17, 18 are preferably provided. Upper cross-bar 7 is preferably provided with a horizontal cross-bar lock 17. Similarly, when cross-brace(s) 50 are horizontally adjustable, cross-brace(s) 50 are preferably provided with a horizontal cross-brace lock 18. Horizontal cross-bar lock 17 and cross-brace lock 18 will allow cross-bar 7 and cross-brace(s) 50 to be secured at a desired width. The devices discussed with regard to riser lock 12 will be suitable for horizontal locks 17, 18.

Cross-bar 7, or at least its upper surface, is preferably padded. Suitable padding includes rubber, foam, and neoprene. Similarly, frame 6 or the elements of frame 6 that will contact door 2 should preferably be padded to avoid marring door 2. Alternatively, cross-bar 7 and frame 6 may be coated with suitable material to avoid marring door 2 or door knob 29. There are numerous thermoplastic rubber and polyurethane based "liquid rubbers" available in the art that would make suitable coatings.

Base 8 is preferably provided with a lip 19. Lip 19 is sized and positioned to be substantially horizontal when frame 6 is oriented so that risers 9 are substantially vertical. Lip 19 is preferably sized to fit in the space below the bottom 4 of door 2—that is, between bottom 4 and sill 5, if any. Where frame 6 is horizontally adjustable, base 8 and lip 19 will preferably be provided in spaced apart segments 20 so that the width of frame 6 and base 8 may be reduced without segments 20 contacting one another. Lip 19 is preferably formed of the same strong, rigid material used to construct frame 6. Those of skill in the art will appreciate that base 8 and lip 19 may be unitary, especially when base 8 is not adjustable. In such cases, a piece of angle iron, or other material shaped like angle iron, may serve as base 8 and lip 19.

Door lock 1 is further provided with one or more braces 21. Each brace 21 is preferably mounted to frame 6 on a hinge 22. Hinge 22 will allow brace 21 to move between about zero degrees relative to frame 6 and as much as about 45 degrees relative to frame 6. In a preferred embodiment, hinge 22 will allow brace to move between about zero and about 30 degrees relative to frame 6. Brace 21 is preferably provided with a foot 23 at the end of brace 21 proximate base 8 and distal from hinge 22. The lower surface 24 of foot 23 is preferably provided with a slip resistant material, such as a textured rubber. Braces 21 are preferably made of the same strong, rigid material as frame 6.

Figure 4A:
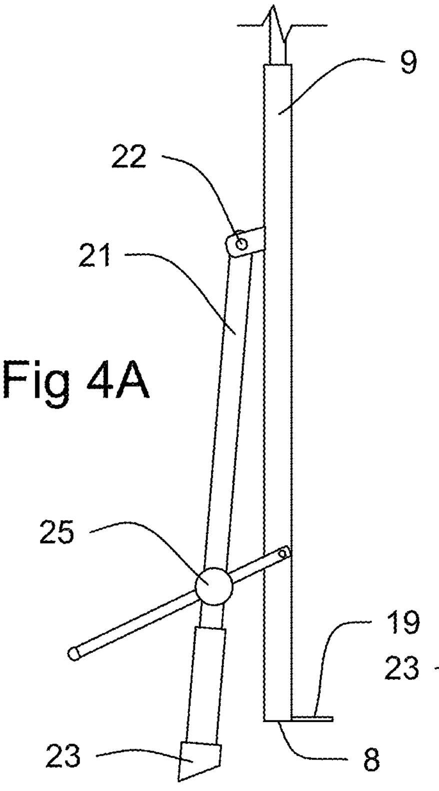
FIG. 4A is a side view of a preferred embodiment of the adjustable door lock with the brace shown in the closed position, illustrating another embodiment of the brace lock.
Figure 4B:
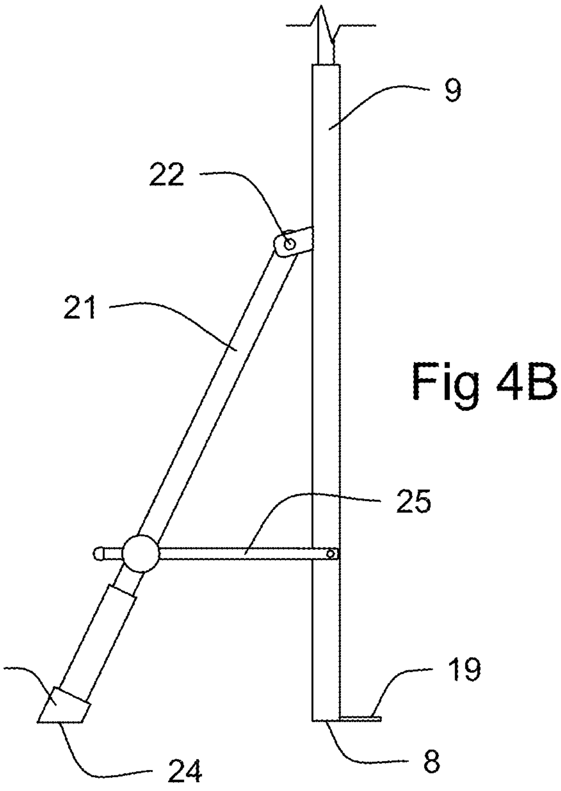
FIG. 4B is a side view of a preferred embodiment of the adjustable door lock with the brace shown in the open position, illustrating the embodiment of the brace lock shown in FIG. 4A.
Figure 4C:
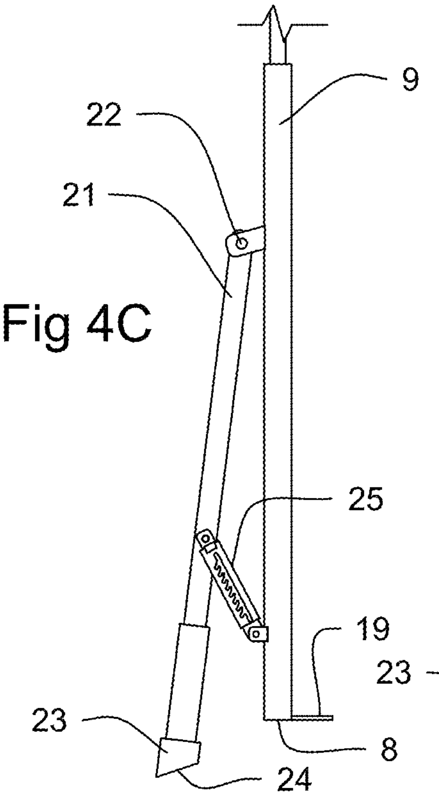
FIG. 4C is a side view of a preferred embodiment of the adjustable door lock with the brace shown in the closed position, illustrating another embodiment of the brace lock.
Figure 4D:
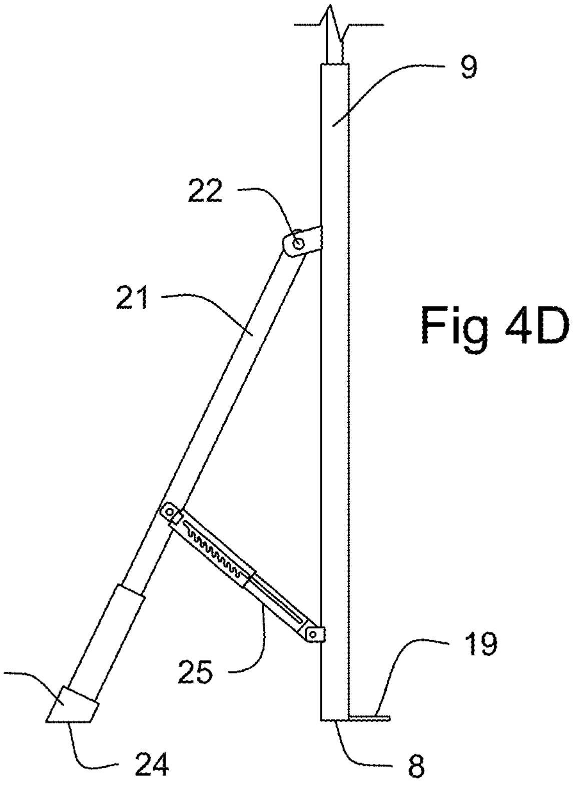
FIG. 4D is a side view of a preferred embodiment of the adjustable door lock with the brace shown in the open position, illustrating the embodiment of the brace lock shown in FIG. 4C.
Figure 5:
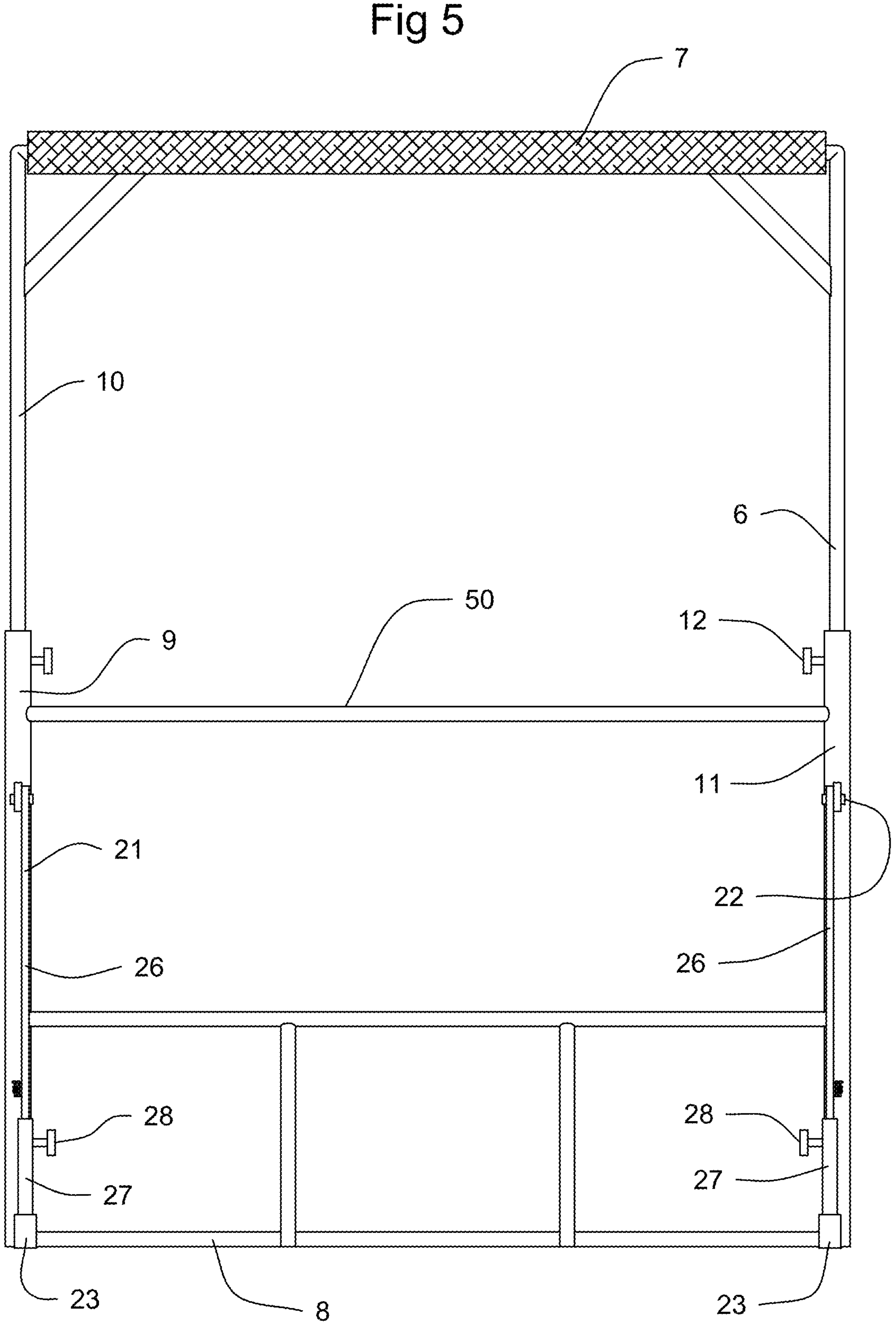
FIG. 5 is a rear view of a preferred embodiment of the adjustable door lock.
Figure 6:
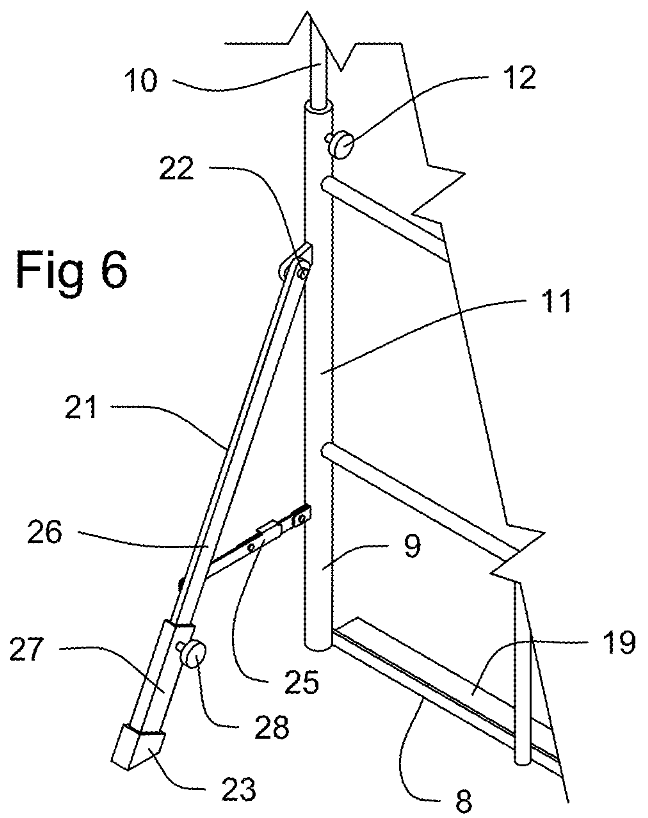
FIG. 6 is a perspective view of the extendable foot of the brace with a foot lock.
Figure 7:
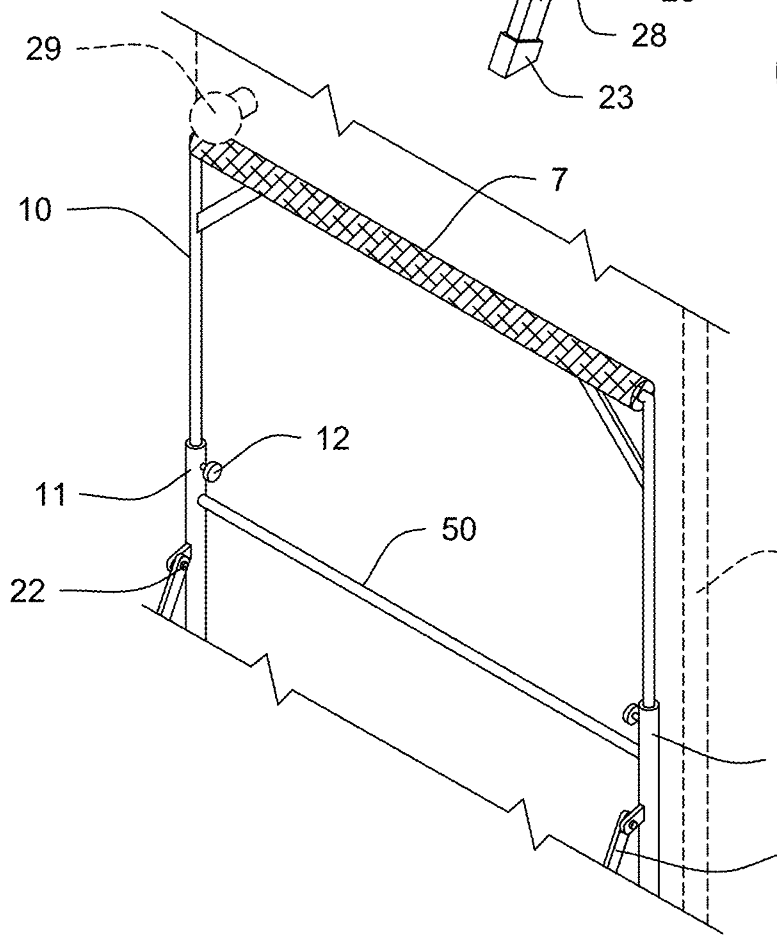
FIG. 7 is a perspective view of two risers, each having a riser lock.
Figure 8:
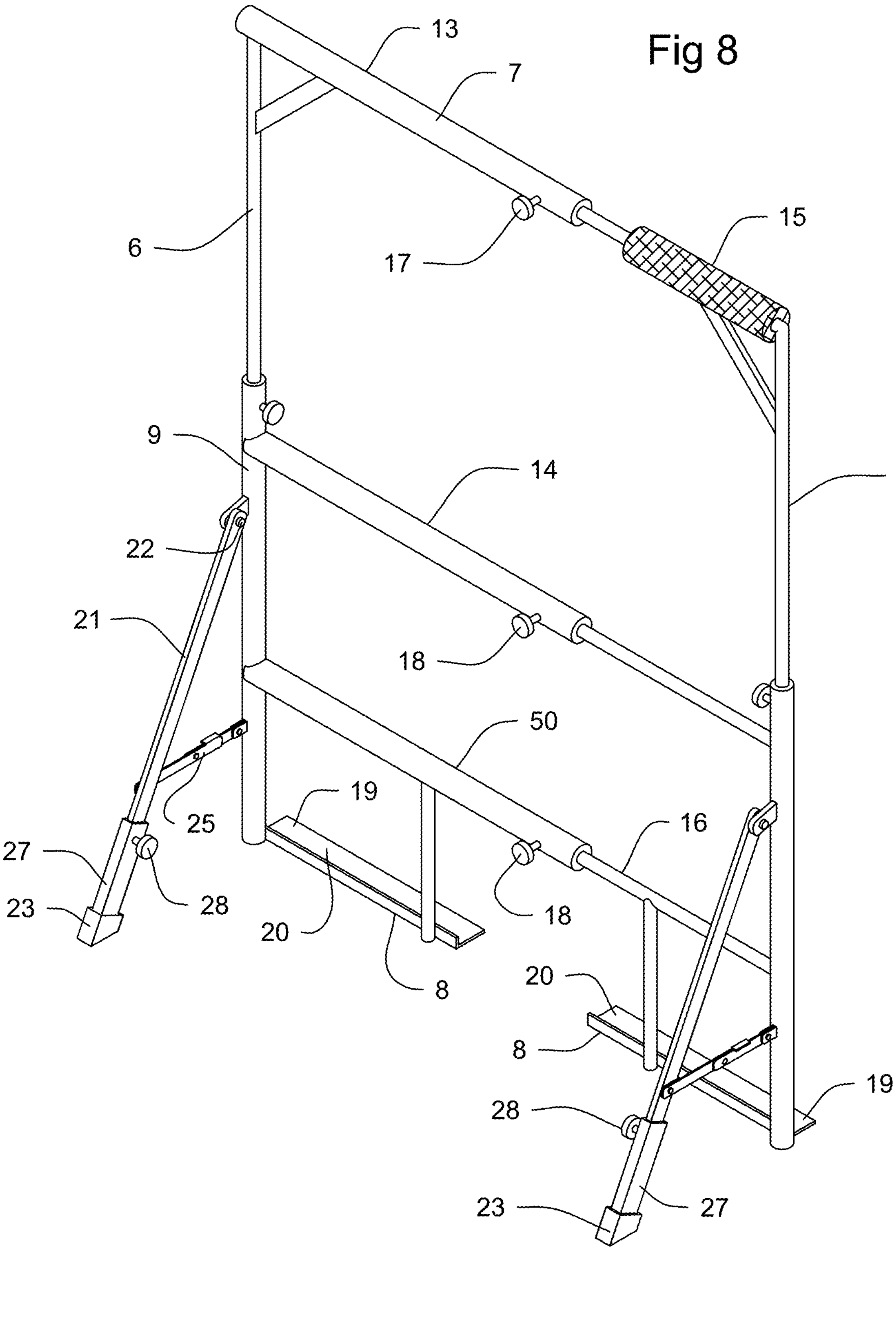
FIG. 8 is a rear perspective view of a preferred embodiment of the lock that is horizontally and vertically adjustable.
Figure 9:
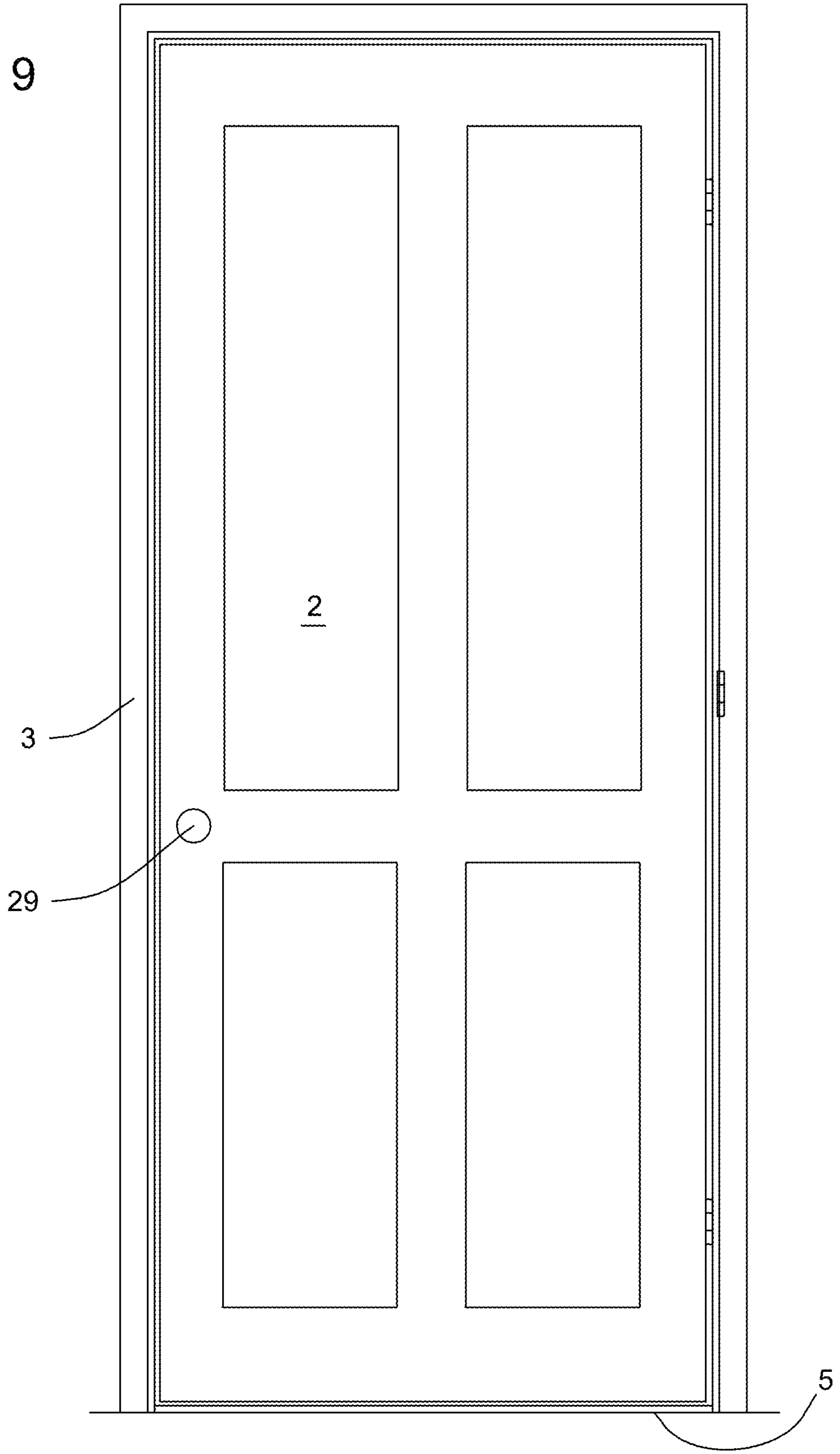
FIG. 9 is an elevation of an inwardly opening door in a frame.
Figure 13:
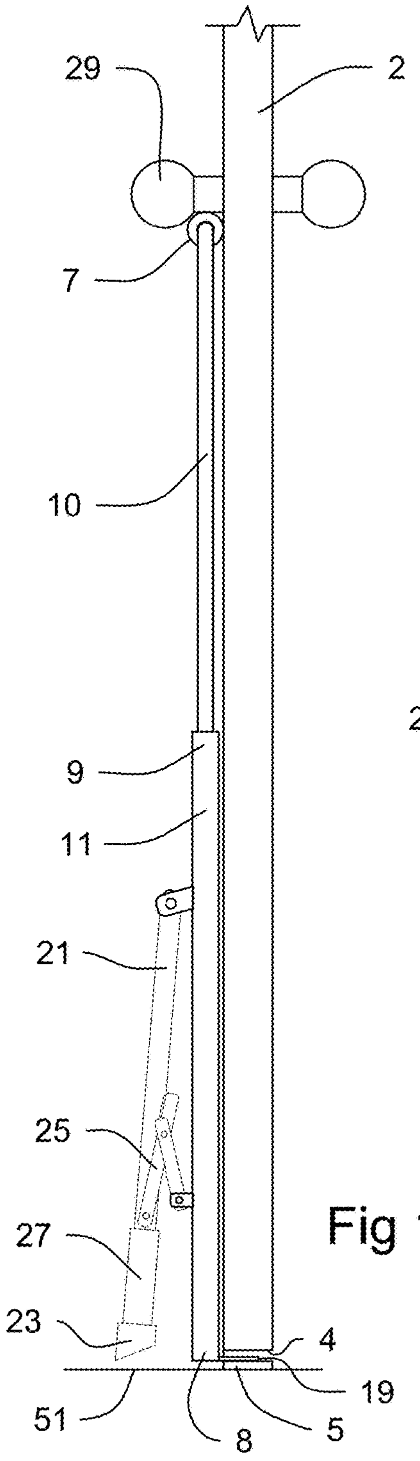
FIG. 13 is a side view of an embodiment of the adjustable lock positioned in front of the door of FIG. 9 with the cross-bar raised to abut the door knob, the lip positioned beneath the door, and the brace in the closed position.
Figure 12:
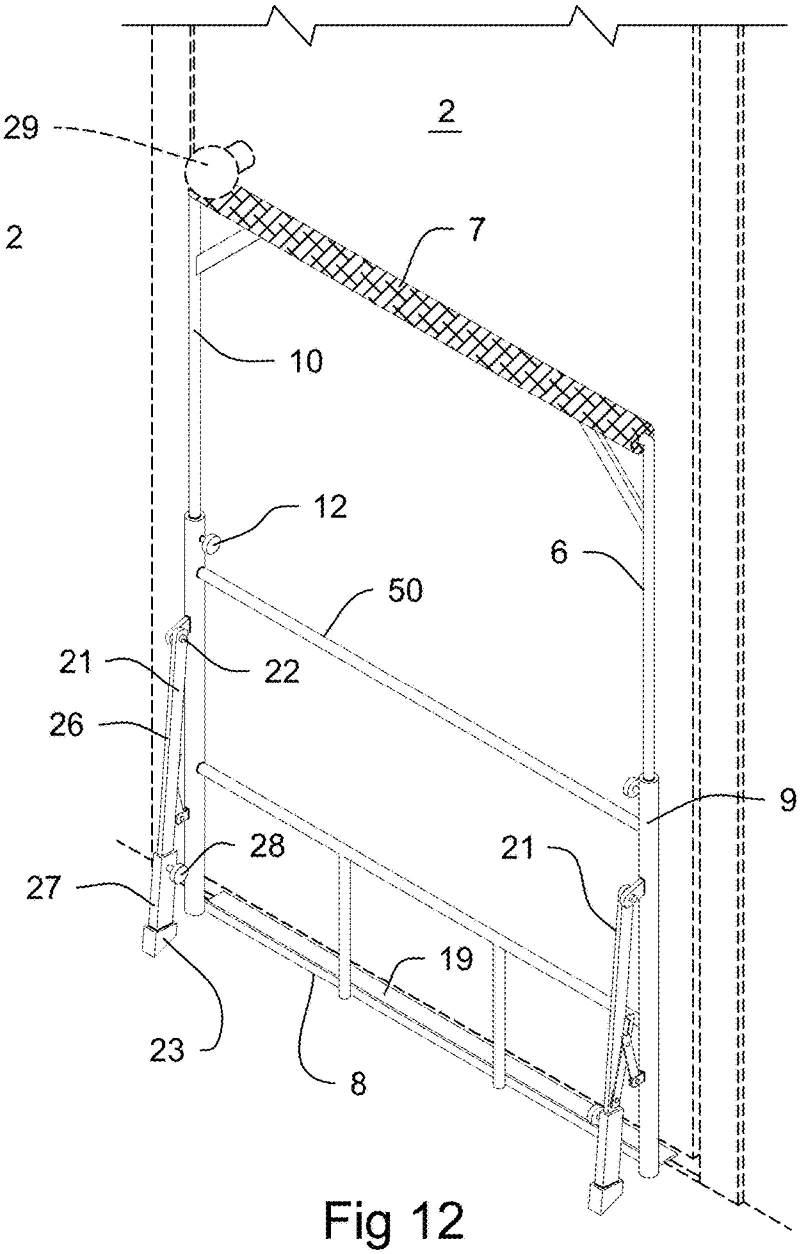
FIG. 12 is a rear perspective view of an embodiment of the adjustable lock positioned in front of the door of FIG. 9 with the cross-bar raised to abut the door knob, the lip positioned beneath the door, and the brace in the closed position.
Figure 15:
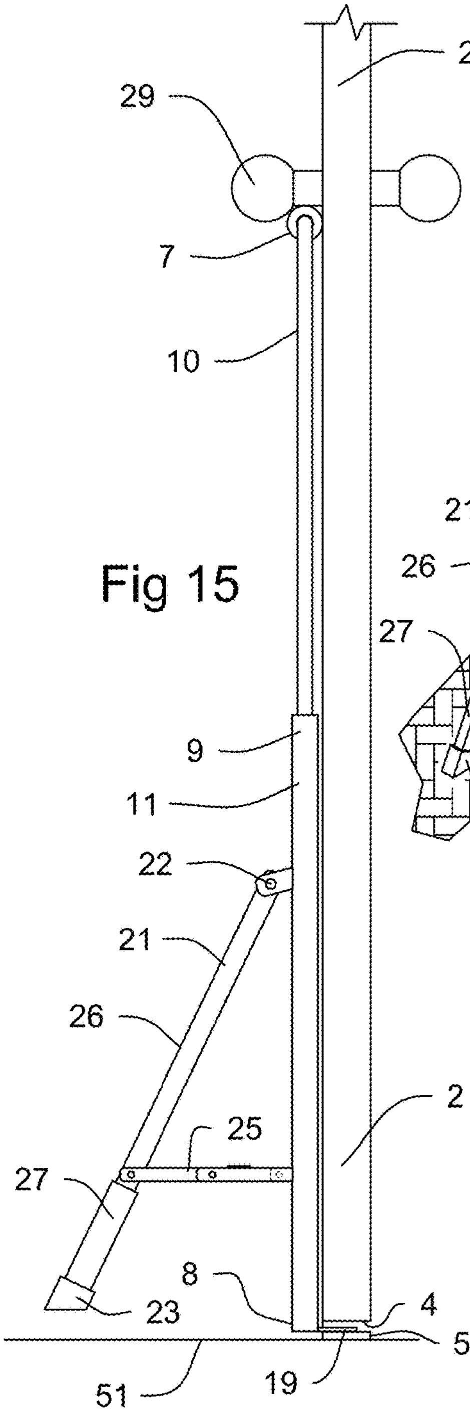
FIG. 15 is a side view of an embodiment of the adjustable lock positioned in front of the door of FIG. 9 with the cross-bar raised to abut the door knob, the lip positioned beneath the door, and the brace in the open position.
Figure 14:
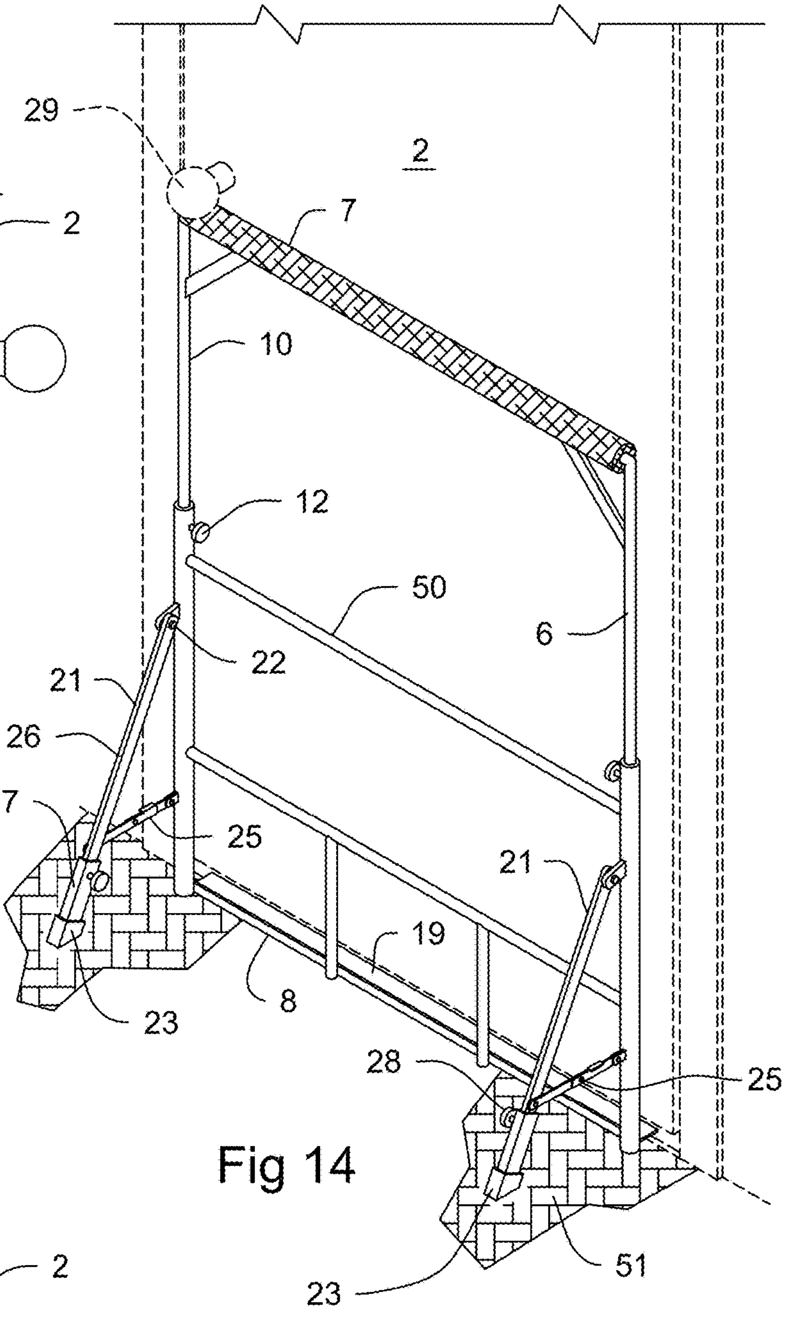
FIG. 14 is a rear perspective view of an embodiment of the adjustable lock positioned in front of the door of FIG. 9 with the cross-bar raised to abut the door knob, the lip positioned beneath the door and the brace in the open position.
Figure 17:
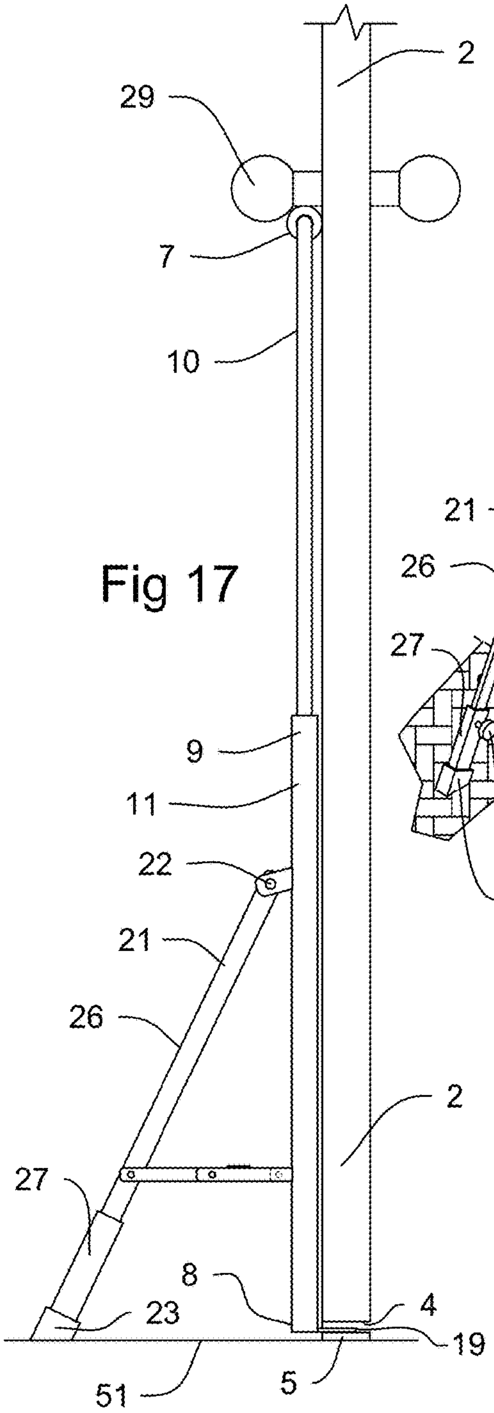
FIG. 17 is a side view of an embodiment of the adjustable lock positioned in front of the door of FIG. 9 with the cross-bar raised to abut the door knob, the lip positioned beneath the door, the brace in the open position, and the lower portion of the brace extended to position the foot of the brace on the floor.
Figure 16:
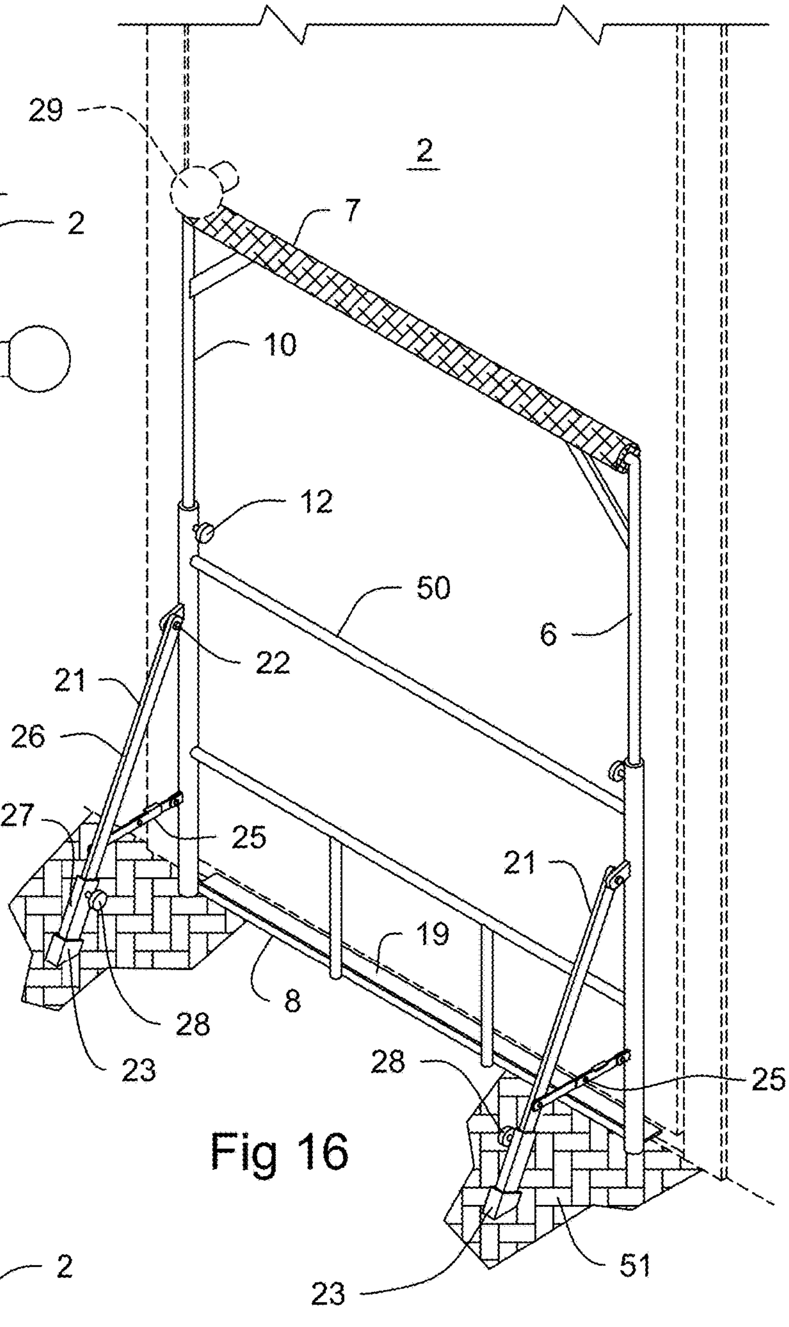
FIG. 16 is a rear perspective view of an embodiment of the adjustable lock positioned in front of the door of FIG. 9 with the cross-bar raised to abut the door knob, the lip positioned beneath the door, the brace in the open position, and the lower portion of the brace extended to position the foot of the brace on the floor.

A brace lock 25 is preferably provided to secure the angle of brace 21 relative to frame 6. Suitable brace locks 25 include an adjustable angle hinge locks, such as those shown in FIGS. 4A-4C. By engaging brace lock 25, the position of brace 21 relative to frame 6 may be fixed.

Figure 3A:
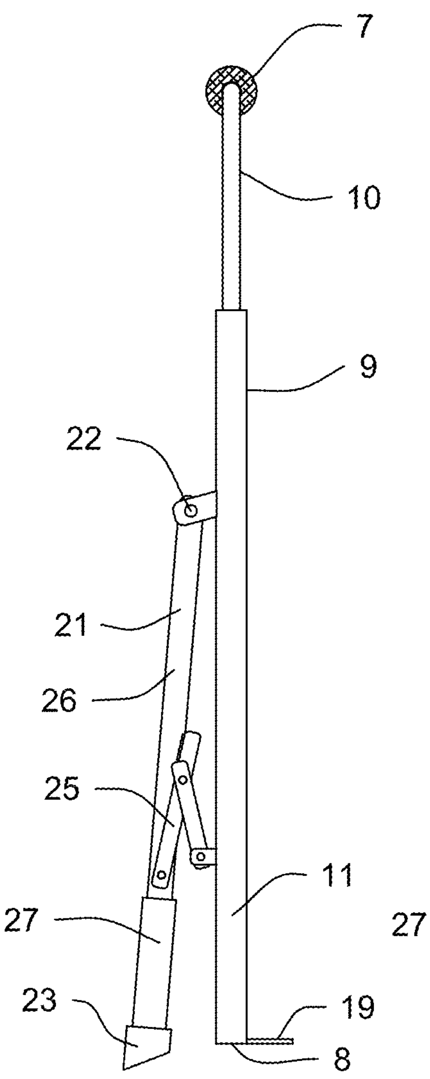
FIG. 3A is a side view of a preferred embodiment of the adjustable door lock with the brace shown in the closed position.
Figure 3B:
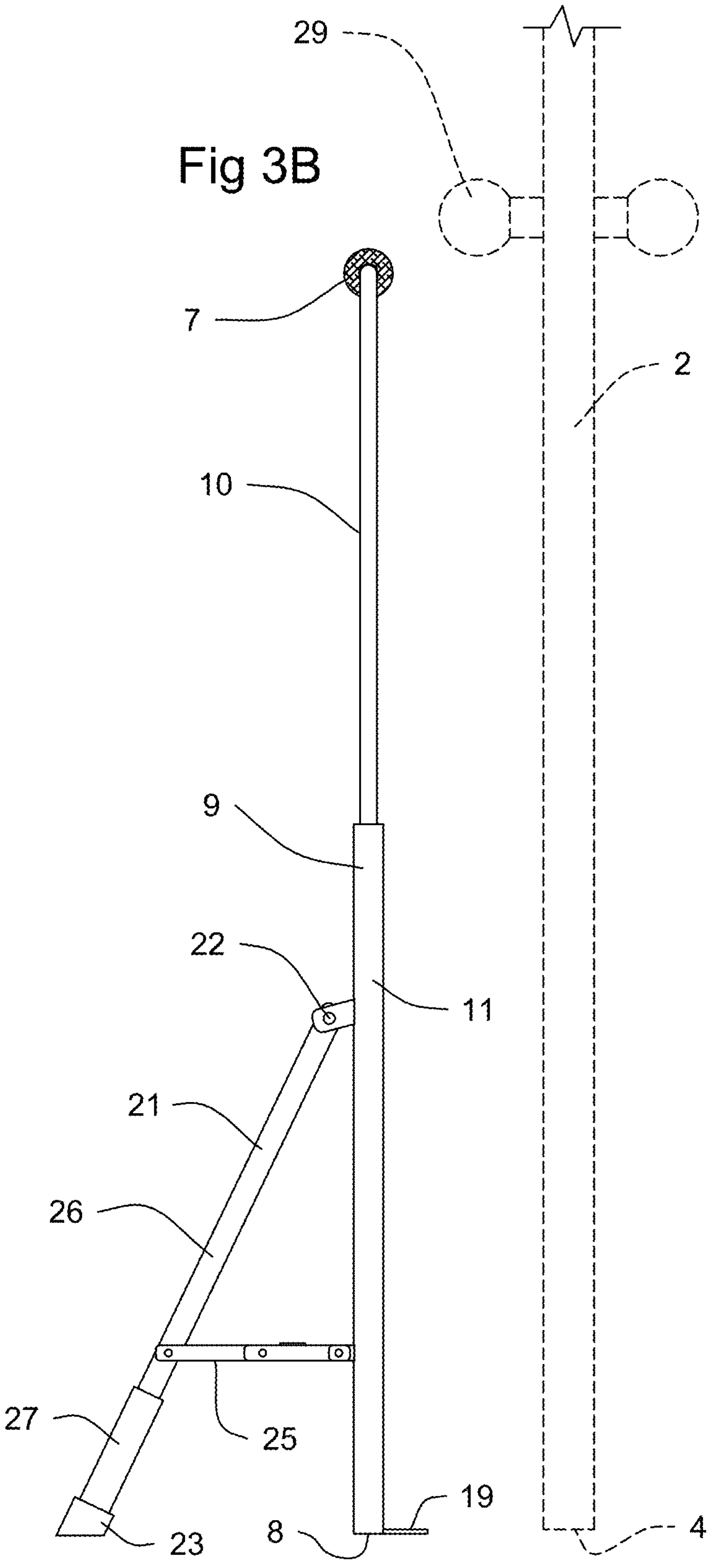
FIG. 3B is a side view of a preferred embodiment of the adjustable door lock with the brace shown in the open position, and illustrating one embodiment of the brace lock.

In an alternative embodiment, the angle of braces 21 relative to frame 6, when brace 21 is open, will be fixed. That is, brace 21 will have a closed position wherein the angle between frame 6 and brace 21 is zero or near zero. Brace 21 will also have an open position in which the angle between frame 6 and brace 21 is greater than zero, and typically between 20 and 40 degrees. However, the angle when brace 21 is in its open position will be predetermined. In this embodiment, brace lock 25 need not be adjustable. It will secure brace 21 in the open position. Folding table leg locks, such as that shown in FIG. 3A-3B will be suitable as brace lock 25.

In the embodiment where the angle between brace 21 and frame 6 is predetermined and fixed when brace 21 is in the open position, it will be particularly useful if the length of brace 21 is adjustable. To achieve this, foot 23 may be extensible relative to brace 21. This may be accomplished by constructing brace 21 of the same slidable material used to make cross-bar 7, cross-brace(s) 50, and risers 9 adjustable, as discussed above. An upper portion 26 of brace 21 will be provided and a lower portion 27 of brace 21 will depend therefrom. Foot 23 will be mounted on lower portion 27 of brace 21. By sliding lower portion 27, relative to upper portion 26, the position of foot 23 may be raised or lowered, as desired. When this embodiment is used, a foot lock 28 may be provided. The devices discussed with regard to riser lock 12 will be suitable for foot lock 28.

In operation, a user inside a space the user wishes to secure will close door 2 and engage any frame based lock door 2 may posses. The user will then insert lip 19 of base 8 beneath bottom 4 of door 2. If sill 5 is present, lip 19 will be positioned between door bottom 4 and sill 5. If no sill 5 is present, lip 19 will be positioned between door bottom 4 and floor 51.

Frame 6 will be positioned immediately adjacent to door 2, with cross-bar 7 positioned below the door knob 29. Most door knobs 29 will be between about 34 and 48 inches above floor 51. Thus, frame 6 should preferably be shorter than 34 inches when risers 9 are in their most vertically contracted position, and frame 6 should be extendable to at least about 48 inches when risers 9 are in their most vertically extended position.

Once frame 6 is in place adjacent door 2, with lip 19 positioned below bottom 4 of door 2, frame 6 will be expanded to bring cross-bar 7 into firm contact with the underside of door knob 29. Riser lock(s) 12 should be engaged to fix the height of frame 6.

Brace or braces 21 will then be moved on hinge 22 from a closed position in which brace 21 is at an angle of zero, or near zero, degrees relative to frame 6 to an open position in which brace 21 is at a non-zero angle, preferably around 30 to 40 degrees, relative to frame 6. Once in the open position, brace lock(s) 25 should be engaged to secure brace(s) 21 in open position.

When brace 21 is in the open position, foot 23 of brace 21 will rest against floor 51 at a point removed from door 2 by several inches, preferably about six inches. Especially when sill 5 is present, the floor 51 proximate door 2 may be lower than the area immediately under door bottom 4, such that foot 23 and base 8 may not be on the same level. In such cases, it may be desirable to adjust the angle of brace 21 relative to frame 6 in order to bring foot 23 into contact with floor 51 while keeping frame 6 immediately in contact with door 2. Alternatively, where brace 21 includes upper portion 26 and lower portion 27, foot 23 may be lowered into contact with the floor by extending lower portion 27 relative to upper portion 26. Similarly, upper and lower portions 26, 27 of brace 21 may be contracted to allow brace to be fully opened while maintaining contact between foot 23 and floor 51. Once upper and lower portions 26, 27 of brace 21 have been adjusted to bring foot 23 into firm contact with the floor, foot lock 28 will preferably be engaged to secure the relative position of upper and lower portions 26, 27 and the overall length of brace 21.

It will be appreciated that brace 21 could be a single brace centrally positioned on frame 2. Similarly, brace 21 could be a single brace substantially the same width as frame 2. Brace 21 could also be comprised of multiple braces independently hinged to frame 2 such that each brace 21 may be independently moved between the open and closed position.

Most doors 2 are 30 to 36 inches wide. In most applications, it will desirable that frame 6 be no wider than door 2, and frame 6 may be less wide than door 2 without reducing the effectiveness of lock 1. Having frame 6 be less wide than door 2 will allow door 2 to protect lock 1 from anyone who might try to reach and defeat or compromise lock 1 via any space between door 2 and door frame 3. Thus, in some embodiments, the width of frame 6 will be fixed, preferably at about 28-30 inches. However, in some embodiments, the width of frame 6 is adjustable. In these embodiments, the width of frame 6 will be increased or decreased to the desired width, and fixed using horizontal cross-bar lock 17 and cross-brace lock(s) 18. One particular application in which a wider frame 6 may be desirable is when a single lock 1 is being used to secure double doors. In such an application, it may be desirable for lock 1 to be centrally positioned across both doors.

When lock 1 is in place any attempt to open door 2 will be resisted by lock 1. It will be appreciated that by expanding frame 6 until cross-bar 7 is in firm contact with knob 29, cross-bar 7 will necessarily be pressing against knob 29 while lip 19 and base 8 will be pressing against sill 5 and/or the floor 51 under and immediately adjacent to door 2. Frame 6 cannot move up or down without destroying or removing knob 29. The pressure between frame 6 and knob 29 as well as the pressure between frame 6 and the floor and/or sill 5 will resist any lateral motion of frame 6. Door 2 will prevent any outward motion of frame 6. Brace(s) 21 will prevent inward motion of frame 6. Thus, lock 1 will prevent door 2 from being opened in an inward direction.

The preferred position of lock 1 will reinforce the most vulnerable portion of many doors. When doors are attacked in their bottom third, the door acts as a lever on the bolt securing the door to the door frame. As the door flexes in response to the blow or kick, it pivots on the bolt securing the door to the door frame. That flexion will concentrate the force of the blow on the bolt and the portions of the frame securing the bolt. If the frame fails, the conventional lock will fail. When lock 1 is in place, frame 6 will be positioned across much of the bottom third to half of door 2. If an intruder kicks or strikes the lower portion of door 2, lock 1 will distribute the force of any such blow across frame 6. Lock 1 will prevent door 2 from flexing. That, in turn, will minimize the force applied to the door's deadbolt and to the door frame. Lock 1 can secure door 2 without a conventional dead bolt or latch bolt being present. However, when lock 1 is used in conjunction with a dead bolt or latch bolt, the locking mechanisms will complement and reinforce each other.

Although the preferred embodiment has been described, those skilled in the art to which the present invention pertains will appreciate that modifications, changes, and improvements may be made without departing from the spirit of the invention defined by the following claims.

The invention claimed is:

1. An adjustable lock for securing a door having a knob and a bottom, wherein the door lock comprises:

a frame having a base opposite an upper cross-bar and at least two vertical risers extending from the base to the upper cross-bar;

wherein the base has a substantially horizontal lip configured to fit beneath the door bottom;

wherein each of the at least two vertical risers contains an upper portion and lower portion slidably disposed relative to each other, whereby the length of each of the at least two vertical risers may be adjusted; and wherein said upper and lower portions of said vertical risers are sized and configured to allow said substantially horizontally disposed lip to be positioned beneath the bottom of the door and the upper cross-bar raised to abut the door knob;

a riser lock positioned on at least one of the at least two vertical risers, whereby the position of the upper portion relative to the lower portion of the at least one vertical riser may be secured;

a brace having a foot, wherein said brace is adjustably mounted to said frame on a hinge configured to create an angle between said brace and said frame of between zero and about forty-five degrees, whereby said brace may be adjusted to position said foot on a surface proximate to said door bottom; and a brace lock configured to secure the brace in a desired angle relative to said frame.

2. The adjustable lock for securing a door according to claim 1 wherein said frame is horizontally adjustable.

3. The adjustable lock for securing a door according to claim 2 wherein said upper cross-bar comprises a left hand portion and a right hand portion slidably disposed relative to each other, whereby the width of the upper cross-bar may be adjusted.

4. The adjustable lock for securing a door according to claim 3 further comprising a cross-bar lock configured to secure the upper cross-bar at a desired width.

5. The adjustable lock for securing a door according to claim 3 wherein said frame comprises a cross-brace further comprising a left hand portion and a right hand portion slidably disposed relative to each other, whereby the width of the frame may be adjusted.

6. The adjustable lock for securing a door according to claim 5 further comprising a cross-brace lock configured to secure the frame at a desired width.

7. The adjustable lock for securing a door according to claim 6 wherein said base comprises a left hand portion and a right hand portion and wherein said lip comprises a plurality of segments, and wherein at least one of said plurality of lip segments is contained on each of the left hand and right hand portions of the base.

8. The adjustable lock for securing a door according to claim 1 wherein the upper bar lock is padded.

9. The adjustable lock for securing a door according to claim 1 wherein the foot is provided with a slip resistant lower surface.

10. The adjustable lock for securing a door according to claim 1 wherein said brace comprises an upper portion and a lower portion slidably disposed relative to each other and wherein said lower portion further comprising said foot.

11. The adjustable lock for securing a door according to claim 10 wherein said brace further comprises a foot lock configured to secure said upper and lower portion of said brace in a desired positioned relative to each other.

12. The adjustable lock for securing a door according to claim 11 wherein the foot is provided with a slip resistant lower surface.

13. The adjustable door lock for securing a door according to claim 1 wherein the frame and the brace are comprised of steel.

14. The adjustable door lock for securing a door according to claim 1 further comprising at least two riser locks, wherein at least one of each of said at least two riser locks is positioned on each of said vertical risers.

15. A method of securing an inwardly opening door having a knob and a bottom positioned proximate a floor, wherein the door is secured using a door lock comprising a frame having a base opposite an upper cross-bar and at least two vertical risers extending from the base to the upper cross-bar; wherein the base has a substantially horizontal lip configured to fit beneath the door bottom; wherein each of the at least two vertical risers contains an upper portion and lower portion slidably disposed relative to each other, whereby the length of each of the at least two vertical risers may be adjusted; a riser lock positioned on at least one of the at least two vertical risers, whereby the position of the upper portion relative to the lower portion of the at least one vertical riser may be secured; a brace having a foot, wherein said brace is adjustably mounted to said frame on a hinge configured to create an angle between said brace and said frame of between zero and about forty-five degrees; and a brace lock configured to secure the brace in a desired angle relative to said frame; wherein the method comprises:

positioning the substantially horizontal lip beneath the door bottom;

positioning the frame adjacent to the door;

extending the upper portion of each of the at least two vertical risers until the upper cross-bar is in contact with said door knob;

moving said brace on said hinge relative to said frame until said foot is in contact with said floor;

engaging said brace lock to fix the angle of said brace relative to said frame; and engaging said riser lock to secure the upper cross-bar in contact with the door knob.

16. A method of securing an inwardly opening door having a knob and a bottom positioned proximate a floor, wherein the door is secured using a door lock comprising a frame having a base opposite an upper cross-bar and at least two vertical risers extending from the base to the upper cross-bar; wherein the base has a substantially horizontal lip configured to fit beneath the door bottom; wherein each of the at least two vertical risers contains an upper portion and lower portion slidably disposed relative to each other, whereby the length of each of the at least two vertical risers may be adjusted; a riser lock positioned on at least one of the at least two vertical risers, whereby the position of the upper portion relative to the lower of portion of the at least one vertical riser may be secured; a brace having an upper portion and a lower portion slidably disposed relative to each other, said lower portion of said brace further comprising a foot, said brace further comprising a foot lock configured to secure said upper and lower portion of said brace in a desired positioned relative to each other, wherein said brace is adjustably mounted to said frame on a hinge configured to create an angle between said brace and said frame of between zero and about forty-five degrees and a brace lock configured to secure the brace in a desired angle relative to said frame; wherein the method comprises:

positioning the substantially horizontal lip beneath the door bottom;

positioning the frame adjacent to the door;

extending the upper portion of each of the at least two vertical risers until the upper cross-bar is in contact with said door knob;

moving said brace on said hinge relative to said frame until said foot is proximate to said floor;

extending said lower portion of said brace relative to said upper portion until said foot is in contact with said floor;

engaging said foot lock to secure the position of said lower portion of said brace relative to said upper portion;

engaging said brace lock to fix the angle of said brace relative to said frame; and engaging said riser lock to secure the upper cross-bar in contact with the door knob.

17. A method of securing an inwardly opening door having a knob and a bottom positioned proximate a floor, wherein the door is secured using a door lock comprising a frame having a base opposite an upper cross-bar and at least two vertical risers extending from the base to the upper cross-bar; wherein said upper cross-bar comprises a left hand portion and a right hand portion slidably disposed relative to each other, whereby the width of the upper cross-bar may be adjusted, said upper cross-bar further comprising a cross-bar lock configured to secure the upper cross-bar at a desired width; wherein the frame further comprises a cross-brace further comprising a left hand portion and a right hand portion slidably disposed relative to each other, wherein the cross-brace further comprising a cross-brace lock configured to secure the cross-brace at a desired width; wherein the base has a substantially horizontal lip configured to fit beneath the door bottom; wherein each of the at least two vertical risers contains an upper portion and lower portion slidably disposed relative to each other, whereby the length of each of the at least two vertical risers may be adjusted; a riser lock positioned on at least one of the at least two vertical risers, whereby the position of the upper portion relative to the lower of portion of the at least one vertical riser may be secured; a brace having a foot, wherein said brace is adjustably mounted to said frame on a hinge configured to create an angle between said brace and said frame of between zero and about forty-five degrees and a brace lock configured to secure the brace in a desired angle relative to said frame; wherein the method comprises:

expanding or contracting the frame to a desired width;

engaging the cross-bar lock to secure the cross-bar at a desired width;

engaging the cross-brace lock to secure the cross-brace at a desired width;

positioning the substantially horizontal lip beneath the door bottom;

positioning the frame adjacent to the door;

extending the upper portion of each of the at least two vertical risers until the upper cross-bar is in contact with said door knob;

moving said brace on said hinge relative to said frame until said foot is in contact with said floor;

engaging said brace lock to fix the angle of said brace lock relative to said frame; and engaging said riser lock to secure the upper cross-bar in contact with the door knob.

* * * * *